United States Patent [19]

Bergmann

[11] Patent Number: 5,363,461
[45] Date of Patent: Nov. 8, 1994

[54] FIELD INSTALLABLE OPTICAL FIBER CONNECTORS

[76] Inventor: Ernest E. Bergmann, 730 Seneca St., Bethlehem, Pa. 18015

[21] Appl. No.: 95,127

[22] Filed: Jul. 20, 1993

[51] Int. Cl.⁵ ............................................. G02B 6/36
[52] U.S. Cl. ..................................................... 385/78
[58] Field of Search .................. 385/60, 62, 35, 66, 385/67, 68, 78, 80, 84, 88

[56] References Cited

U.S. PATENT DOCUMENTS

| | | | |
|---|---|---|---|
| 3,948,582 | 4/1976 | Martin | 385/88 |
| 4,185,883 | 1/1980 | Chown et al. | 385/78 |
| 4,199,222 | 4/1980 | Ikushima et al. | 385/88 |
| 4,330,171 | 5/1982 | Malsot et al. | 385/80 |
| 4,615,581 | 10/1986 | Morimoto | 350/96.21 |
| 4,662,713 | 5/1987 | Davies et al. | 350/96.20 |
| 4,691,986 | 9/1987 | Aberson, Jr. et al. | 350/96.21 |
| 5,082,377 | 1/1992 | Jarret et al. | 385/60 |
| 5,190,536 | 3/1993 | Wood et al. | 385/35 |
| 5,224,186 | 6/1993 | Kishimoto et al. | 385/78 |

Primary Examiner—Rodney B. Bovernick
Assistant Examiner—John Ngo

[57] ABSTRACT

An optical fiber connector for terminating an optical fiber which has a ferrule or plug member located therein. The plug member has a bore extending therethrough and an optical fiber stub fixed in the bore extending from the front face of the plug to a point within the bore intermediate its ends. One or more channel members in the plug overlap the end of the stub within the plug. The channel members provide, in effect, a receptacle for excess index matching gel when the fiber being terminated is inserted from the rear of the bore and pressed forward to compress the gel. Crimping members are mounted on the rear of the plug and are adapted to grip the protection coating of the fiber being terminated to fix the fiber and the plug relative to each other.

10 Claims, 2 Drawing Sheets

FIELD INSTALLABLE OPTICAL FIBER CONNECTORS

FIELD OF INVENTION

This invention relates to optical fiber connectors and,, more particularly, to such connectors adapted for ready installation in the field.

BACKGROUND OF THE INVENTION

The termination of an optical fiber with a connector in a field environment generally is a costly and labor intensive process, and has thus slowed the acceptance of fiber optics in both local and wide area networks, as well as in other applications. Additionally, connectors for use in forming terminations of the fiber are generally of such a nature that only limited numbers of individual fibers can be terminated in, for example, a day. Connectors presently in use often require that special tools be present at the job site. Thus, where the fiber end being connected is held within the connector by means of an ultra-violet or heat cured epoxy, a source of ultra-violet light or of heat must necessarily form a part of the tool kit of the technician making the termination. Also, the use of epoxy is time consuming. Generally, when, for example, a heat cured epoxy has been applied, the entire connector assembly must be heat cured for several minutes, and then several more minutes are involved until the assembly is cooled sufficiently for the fiber tip to be polished.

The prior art is rife with connector designs that have been proposed and marketed and that are aimed at increasing installation efficiency through reduction or elimination of one or more of the aforementioned problems. One such approach involves the use of a hot melt glue instead of a heat cured epoxy to affix the fiber to the connector. In this arrangement, the technician places the connector in a heater for a short time to melt a premeasured amount of glue previously placed within the connector. The fiber is then inserted, and, after the connector has cooled for a short time, the tip of the fiber can be polished. Such a hot melt connector has been found to reduce the time involved to completion, and is relatively simple to assemble. However, it is not recommended for use in installation subject to high temperatures. Another approach to the elimination of dependence upon epoxy to affix the fiber to the connector or termination has been the use of crimp-on connectors which form a mechanical connection between the connector and the fiber. Unless the crimping portion grasps the fibers firmly, pistoning of the fiber may occur, and the integrity of the connector jeopardized.

In all of the foregoing arrangements, it is necessary, after the fiber is affixed in place, to cleave and polish that end of the fiber intended to mate with the fiber with which it is to be connected. This, too, requires the use of special tools, and at least some measure of experience and skill on the part of the technician. In U.S. Pat. No. 5,082,377 of Jarrett et al., there is shown an optical fiber connector which eliminates the need for cleaving and polishing the end of the fiber, thereby reducing both preparation time and reliance on the skill of the technician. The basic component of the connector which makes this possible is a cylindrical body or plug having an axial bore extending therethrough. A short optical stub member of a material having the same index of refraction as the optical fiber to be terminated is located within the bore with one end flush with the end of the cylindrical body, and both are ground and polished to produce a uniformly flat front face. The rear end of the stub, within the bore, is a planar surface. This much of the connector, including the other mechanical and structural elements thereof is manufactured and pre-assembled at the factory, for example, and can be carried into the field by the technician. When an optical fiber is to be terminated by the connector, the end of the fiber is stripped of its protective coating and the end face cleaved. A thin metered layer of index matching polymerizable resin is then placed on the end face of the fiber which is inserted into the bore until it reaches the rear end face of the stub member. The resin is then cured, as by ultraviolet radiation or heat, to bind the fiber end to the stub.

The use of a polymerizable resin for index matching and securing the fiber within the connector, as in the connector of the Jarrett et al. patent, has numerous drawbacks. The resin itself tends to develop numerous microscopic bubbles which degrade the index match, thereby increasing insertion loss. Also, because of the extremely small area of fixation of the end of the fiber to the end of the stub, the cemented joint is not reliable, especially if tensile forces are applied, as they usually are in such connection arrangements, thus placing a strain upon the joint. In order for there to be as perfect an axial alignment as possible between the stub and the fiber, the bore through which the fiber is inserted is only fractions of a micron greater in diameter than the fiber, thus keeping it aligned within the stub. However, such a close fit does not provide space into which the excess resin can spread when it is compressed between the fiber end and the stub end. As a consequence, the resin, which can only be compressed a certain amount, can prevent the fiber end from closely abutting the stub end, which, ideally, is the preferred relationship for minimizing transmission losses.

An optical fiber connector that is easily and inexpensively produced, that can be quickly and easily and thereby economically installed in the field by relatively unskilled personnel, which has low insertion loss and which can withstand the tensile forces ordinarily encountered by connectors during and after installation would clearly be an advance over the connector arrangements which characterize the present state of the art.

SUMMARY OF THE INVENTION

The present invention is a modular plug which is designed for use in any of a number of butt coupling connectors, such as, for example ST ®, Biconic and the like, or in other types of connectors as well.

The plug of the invention, in a preferred embodiment thereof, comprises an elongated ferrule of ceramic, plastic, or metal having a central bore extending therethrough. An optical fiber stub is inserted into the bore from the front end and extends along a portion of the length thereof. The stub may be glued or otherwise affixed within the bore, with a first end of the stub being substantially flush with the front end of the ferrule. The end face of the ferrule and the first end of the stub are polished to achieve a planar surface having a high degree of flatness. The second or rear end of the stub is cleaved prior to insertion into the ferrule so that it, too, is substantially flat.

The ferrule has a groove or channel formed therein which communicates with the bore, and which extends longitudinally from the rear face of the ferrule to a point therein slightly beyond or closer to the front of the ferrule than the end of the fiber stub. At the rear of the ferrule are mounted and affixed crimping arms or members. As thus far described, the plug of the invention can be prepared at the manufacturing facility. Stubs having different transmission characteristics to match the different optical fiber transmission characteristics likely to be encountered in the field can be prepared to create a broad range of connectors or couplers. The plug as prepared may form a part of many of the different types of connectors, as mentioned hereinafter.

In the field, the fiber to be terminated is stripped of its protective coating over a short portion of its length, and the distal end thereof preferably is cleaved. A quantity of an index matching gel is inserted into the bore to bear against the cleaved end of the stub, and the fiber is inserted into the bore from the rear until it presses against the gel. Compression of the gel causes the excess thereof to flow into the channel or groove so that the end of the fiber substantially bears against the interior end of the stub with only a thin layer of index matching gel therebetween. The fiber is then glued or cemented in place by a fast setting glue inserted into the channel from the rear, and the crimping arms are crimped to grasp the protective coating of the unstripped portion of the fiber. The fiber is, therefore, terminated by the connector, of which the plug is a fundamental part, which is then ready for connection to the receiving connector.

DETAILED DESCRIPTION

Figure 1:
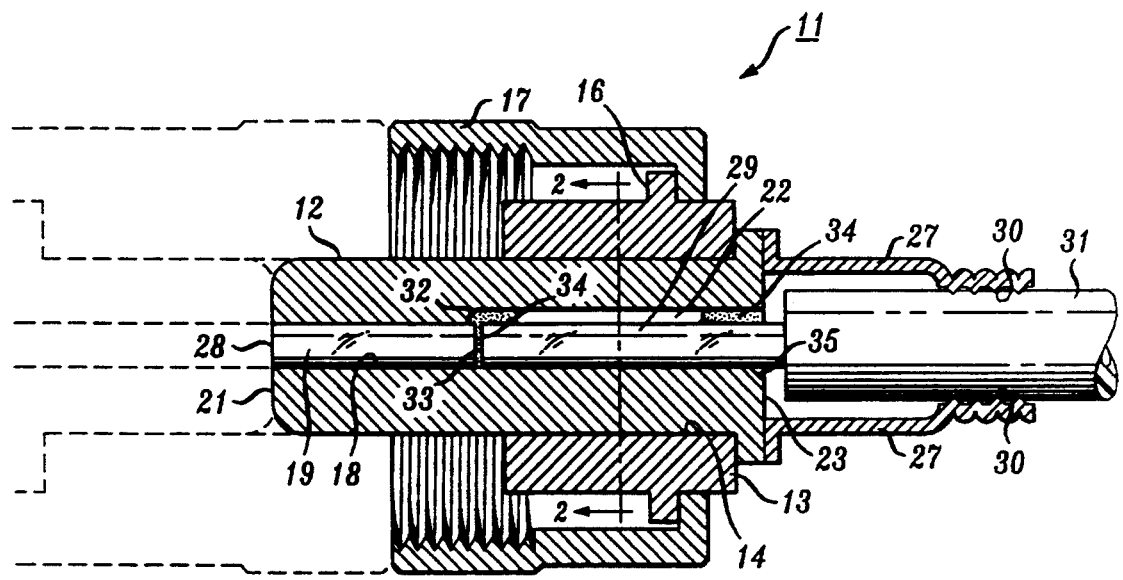
FIG. 1 is a side elevation cross-sectional view of a connector having as a component thereof the plug of the present invention.
Figure 2:
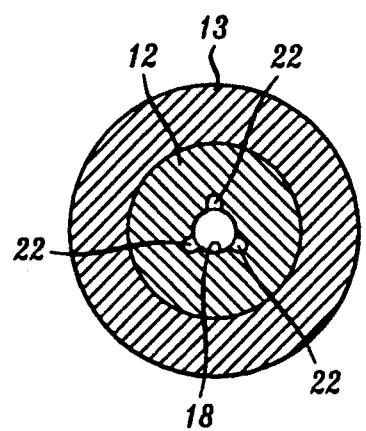
FIG. 2 is a cross-sectional view of a portion of the connector of FIG. 1 taken along the line A—A.

In FIGS. 1 and 2 there is shown a connector 11 having as a component thereof a plug 12 which embodies the principles of the present invention. Connector 11 is a generic representation of any of a number of connector types, and is not intended to depict any one particular type of connector, being intended solely to illustrate a housing for the plug 12. Connector 11 comprises a body member 13 having a bore 14 for accommodating plug 12, which may be metal, ceramic, or plastic or other suitable material, which is affixed thereto by any suitable means, such as cement or glue. Body member 13 which may be made of metal, ceramic, plastic, or other suitable material, depending upon the particular type of connector used, has a flange or shoulder member 16 which functions as a stop for an internally threaded attaching ring 17.

Plug 12 has an axial bore 18 extending therethrough in which is located an optical fiber stub 19 extending from the front face 21 of plug 12 into the plug for a portion of its length, and also has one or more channels or grooves 22 which communicate with bore 18 and which extend into plug 12 from the rear face 23 thereof to a point adjacent and preferably beyond the rear end 24 of stub 19, i.e., overlapping the rear end 24. The rear face 23 of plug 12 has affixed thereto as by gluing, brazing, welding, riveting or other suitable means two or more crimping arms 27, 27 having toothed or roughened surfaces 30, 30 which will be discussed more fully hereinafter. Where plug 12 is made of, for example, metal, arms 27, 27 conceivably can be made integral therewith, provided that they are deformable.

As thus far discussed, connector 11 and plug 12 may be, and preferably are, manufactured and assembled at a manufacturing facility. As part of the manufacturing of the plug 12, the front face 21 thereof and the front face 28 of stub 19 are ground and polished to produce a planar surface designed to butt against a similar surface, shown in dashed lines in FIG. 1, at the installation site. It is not necessary, however, that the plug 12 can be assembled with the connector 11 at the factory. Where the connector is a standard type, plugs having stubs 19 of different indices of fraction or different light transmission characteristics may be carried by the technician to the installation site, and the plug having a stub of the same transmission characteristics as the optical fiber to be terminated may then be inserted in, and affixed to, the connector 11. It is not absolutely necessary that plug 12 be affixed to connector 11, but it is desirable that it be a slip-fit within bore 14. When attaching, ring 17 is screwed onto the threaded portion of the mating connector, shown in dashed lines, the compression created thereby causes the flat faces of the mating stubs to seal and bear uniformly against each other, with the stubs axially aligned. It is to be understood that ring 17 is shown as being threaded by way of example only. Other means, such as a bayonet lock may readily be used in place of threads.

The remainder of the assembly depicted in FIG. 1 can best be described in terms of the method involved in terminating a fiber with connector 11. An optical fiber 29 having a protective coating 31 is stripped of a portion of its protective coating, as shown in FIG. 1 for insertion into bore 18 from the rear of the plug or ferrule 12. Prior to insertion, a quantity of an indexing matching gel 32 is introduced into bore 18 and applied to the rear, preferably cleaved, end 24 of stub 19. The gel 32 may be in the form of a liquid, or may have the consistence of, for example, petroleum jelly, or may be of the consistency of a typical caulking material or a silicone rubber material as long as it can be made to flow under pressure. The fiber 29, which preferably has a cleaved end face 33 is inserted into bore 18, which may have a tapered portion 35, as shown, to facilitate insertion of fiber 29 into bore 18, and pushed forward for a longitudinal distance until face 33 contacts the gel 32. Inasmuch as the distance within the plug 12 at which contact occurs cannot be readily determined, the technician performing the termination simply pushes fiber 29 into plug or ferrule 12 until firm resistance is felt. Because the resistance of the gel 32 is minimal, firm resistance indicates that face 33 of fiber 29 abuts face 24 of stub 19 with only very thin layer of gel 32 between the faces, as shown in FIG. 1. The excess gel 32 has been squeezed up into channel 22, as shown, rather than along bore 18, the diameter of which is preferably only a fraction of a micron greater than the diameter of fiber 29. With the end of channel 22 located closer to the front face 21 than the rear end 24 of stub 19, passage of the excess gel 32 into channel 22 is insured. As a consequence, the insertion loss resulting from the discontinuity between fiber 29 and stub 19 is minimized. It can be appreciated that with this arrangement precise measurement of the amount of gel used is not necessary, thereby reducing assembly time. Fiber 29 is affixed to stub 12 by means of, for example, a fast setting cement or glue 34, such as Krazy Glue ®, which is inserted into channel or channels 22 from the rear of plug 12. It is not necessary, therefore, to use a curable epoxy cement to affix fiber 29 to connector 11, and no glue or cement is present in the optical path. After glue 34 has set, which is a matter of seconds, crimp arms 27, 27 are deformed to force the teeth or roughened surfaces on the ends thereof to grip the protective coating 31, as shown in FIG. 1. Both the cement 34 and the crimp arms 27, 27 function to insure a firm stable union of connector 11 to fiber 27 and coating 31, with no pistoning of the fiber 29 within bore 18, and with a strong resistance to tensile forces on the fiber encountered in use, which would tend to place undue strain upon a cemented connection common in the prior art. The sequence of the gluing and crimping steps may be reversed and, in some instances, either one or the other step may be omitted.

Figure 3:
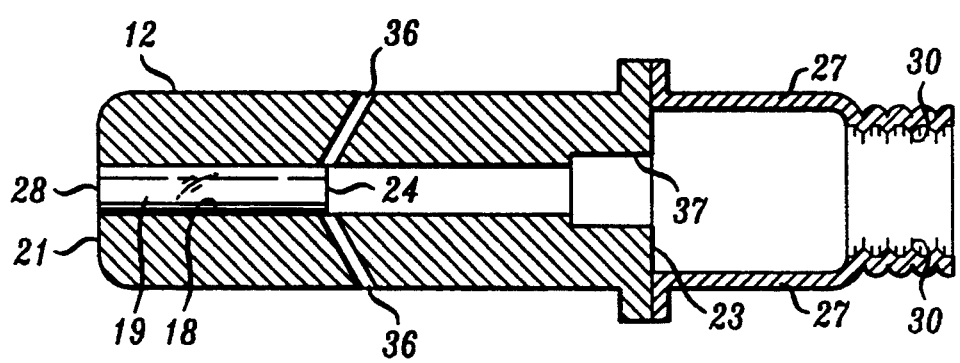
FIG. 3 is a side elevation cross-sectional view of a second embodiment of the plug of the invention.

FIG. 3 depicts another embodiment of ferrule or plug 12 wherein one or more radially extending channels 36, 36 extend from the area of the rear face 24 of stub 19 to the exterior of plug 12. In this embodiment, bore 18 has a countersunk portion 37, as shown, for the application of a quick setting glue to affix fiber 29 in place. Countersink portion 37 is not absolutely necessary for the application of the glue, but it does insure that there will be glue along a portion of the length of fiber 29.

Figure 4:
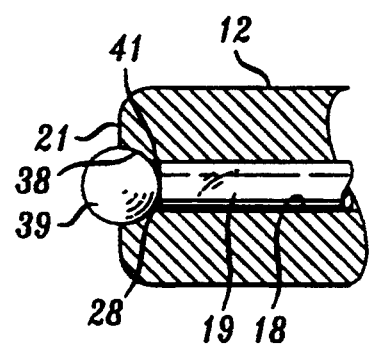
FIG. 4 is a partial view of a variation of the plug of the invention.

In the foregoing embodiments, butt coupling configurations are shown, i.e., a flat face on the connector butts against a flat face on the receiving member. It is also possible for the features and principles of the invention to be used in other than such butt coupling arrangements. For example, the front end 28 of the fiber stub 19 may project outward from the front face 21 of ferrule or plug 12 and may be shaped, as spherically, to focus the light travelling therethrough. Alternatively, a spherical or otherwise shaped focusing member may be located in plug 19 adjacent the front end thereof, as shown in FIG. 4. In FIG. 4, bore 18 terminates in a spherically shaped cup 38 within which is affixed a spherical lens 39, against which the front end 28 of stub 19 bears. If desired or otherwise believed necessary, an index matching gel 41 may be used at the point of contact of lens 39 and stub 19 adjacent front face 21. Although a spherical lens 39 is shown, it may have other shapes as well, in which case cup 38 would be shaped accordingly.

It is to be understood that the foregoing described arrangements are simply illustrative of the principles and features of the invention. Other arrangements may be devised by those skilled in the art while still embodying these principles and features. For example, the foregoing embodiments are shown as being cylindrical in shape, with circular cross-sections. Shapes other than ones of circular cross-section may be used, especially for the ferrule or plug 12, thereby making possible the use thereof in connectors having other than circular cross-sections as well as connectors with a circular cross-section. Thus, it is possible that some sort of a rectilinear block and V-groove arrangement might be used to contain the fiber and a suitable means for holding the fiber therein, such as, for example, a spring. The principles and features of the present invention are thus applicable to a wide variety of connector configurations, without departure from the spirit and scope thereof.

I claim:

1. For use in an optical fiber connector for terminating the end of an optical fiber;
    a ferrule adapted to fit within the connector and to extend axially through at least a portion thereof, said ferrule having a bore formed therein and extending axially therethrough wherein said bore is adapted to receive an end and a portion of the length of the fiber to be terminated;
    said ferrule having a front face and a rear face;
    an optical fiber stub in said bore and extending from a region adjacent said front face toward said rear face, said stub having a front end in the region of said front face and a rear end within said bore and spaced from said rear face whereby the fiber to be terminated is insertable into said bore through said rear face so that the end thereof butts against said real end to form a junction therewith with an index matching material between the fiber and stub ends; and
    means for receiving the excess index matching material comprising at least one channel extending from the region of the junction between said rear end and the fiber end toward the exterior of said ferrule.

2. A ferrule as claimed in claim 1 wherein said channel extends from a point within said ferrule located closer to said front face than is the rear end of said stub.

3. A ferrule as claimed in claim 1 wherein said means for receiving the excess index matching material comprises a plurality of channels extending substantially parallel to said bore and in communication therewith along their coextensive length to said rear face.

4. A ferrule as claimed in claim 1 wherein said means for receiving the excess index matching material comprises a plurality of channels extending radially outward from the region of the junction between said rear end and the fiber end toward the exterior of said ferrule, the inner ends of said channels being located at the junction.

5. A ferrule as claimed in claim 1 and further comprising means for engaging the optical fiber being terminated for maintaining it in fixed relationship to said ferrule.

6. A ferrule as claimed in claim 1 and further comprising means at said front face for focusing light being transmitted by said optical fiber stub.

7. A ferrule as claimed in claim 6 wherein said means for focusing comprises a lens member against which said front end of said stub abuts mounted within a receptacle at the front of said ferrule.

8. A ferrule as claimed in claim 7 wherein said receptacle is shaped to conform to the shape of said lens member.

9. A terminated optical fiber comprising:
    a plug member having an axial bore extending therethrough and having a front face and a rear face;
    an optical fiber stub having predetermined optical transmission characteristics within said bore and extending from a region adjacent said front face to a point within said bore where its rear end is intermediate said front and rear faces;
    an optical fiber having a protective coating thereon and a portion stripped of said protective coating disposed in said bore with the end thereof meeting the rear end of said stub and separated therefrom by a thin layer of index matching material, said fiber having transmission characteristics substantially identical to the transmission characteristics of said stub;

said plug further having channel means therein overlapping said rear end of said stub, said channel means containing any excess index matching gel;

means within said channel means for affixing said portion of said fiber within said bore to said plug; and connector means having a body portion containing said plug and means for affixing said connector means to a receiving means.

10. A terminated optical fiber as claimed in claim 9 and further comprising means on the rear face of said plug for gripping the protective coating on said optical fiber.

* * * * *

UNITED STATES PATENT AND TRADEMARK OFFICE
CERTIFICATE OF CORRECTION

PATENT NO. : 5,363,461
DATED : November 8, 1994
INVENTOR(S) : Ernest E. Bergmann It is certified that error appears in the above-indentified patent and that said Letters Patent is hereby corrected as shown below:

On the Title page:

[73] Assignee: American Telephone and Telegraph Company, New York, N.Y.

Signed and Sealed this

Fifth Day of December, 1995

Attest:

BRUCE LEHMAN

Attesting Officer

Commissioner of Patents and Trademarks